(12) United States Patent
Veyland et al.

(10) Patent No.: US 9,714,339 B2
(45) Date of Patent: Jul. 25, 2017

(54) RUBBER COMPOSITION COMPRISING AN EPOXY RESIN AND A POLYIMINE HARDENER

(71) Applicants: COMPAGNIE GENERALE DES ETABLISSEMENTS MICHELIN; MICHELIN RECHERCHE ET TECHNIQUE, S.A., Granges-Paccot (CH)

(72) Inventors: Anne Veyland, Clermont-Ferrand (FR); Catherine Mougin, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 94 days.

(21) Appl. No.: 14/416,750

(22) PCT Filed: Jul. 24, 2013

(86) PCT No.: PCT/EP2013/065634
§ 371 (c)(1),
(2) Date: Jan. 23, 2015

(87) PCT Pub. No.: WO2014/016346
PCT Pub. Date: Jan. 30, 2014

(65) Prior Publication Data
US 2015/0183983 A1    Jul. 2, 2015

(30) Foreign Application Priority Data
Jul. 25, 2012    (FR) ...................... 12 57196

(51) Int. Cl.
*C08L 9/00*    (2006.01)
*C08L 63/00*    (2006.01)
*B60C 1/00*    (2006.01)
*C08K 5/29*    (2006.01)
*C08L 7/00*    (2006.01)

(52) U.S. Cl.
CPC ................ *C08L 63/00* (2013.01); *C08K 5/29* (2013.01); *C08L 7/00* (2013.01); *Y02T 10/862* (2013.01)

(58) Field of Classification Search
None
See application file for complete search history.

(56) References Cited

U.S. PATENT DOCUMENTS

| | | | | |
|---|---|---|---|---|
| 5,753,727 | A * | 5/1998 | Sato ................... | C08G 59/4042 523/438 |
| 6,444,272 | B1 * | 9/2002 | Matsuda ............ | C08G 59/4042 427/140 |
| 2012/0196960 | A1 * | 8/2012 | Araujo Da Silva . | B60O 1/0016 524/186 |
| 2012/0283360 | A1 * | 11/2012 | Veyland ................... | C08L 7/00 523/467 |

FOREIGN PATENT DOCUMENTS

| | | | |
|---|---|---|---|
| FR | 2951182 | 4/2011 | |
| JP | 2006063206 | 3/2006 | |
| WO | 2011003981 | 1/2011 | |
| WO | WO 2011/003981 A2 * | 1/2011 | ............... B60C 1/00 |
| WO | WO 2011/045342 A1 * | 4/2011 | ............. C08L 21/00 |

OTHER PUBLICATIONS

Database WPI Week 200864 Jun. 26, 2008 Thomson Scientific, London, GB; AN 2008-K75593 XP002692365, & Jp 2008 144044 A (Yokohama Rubber Co Ltd) Jun. 26, 2008.
International Search Report for PCT/EP2013/065634 dated Oct. 25, 2013.

* cited by examiner

*Primary Examiner* — Michael J Feely
(74) *Attorney, Agent, or Firm* — Dickinson Wright PLLC

(57) ABSTRACT

A rubber composition based on at least one diene elastomer, a reinforcing filler, a crosslinking system, an epoxy resin, at a content within a range extending from 1 to 20 phr, and a polyimine hardener, at a content within a range extending from 0.2 to 15 phr.

24 Claims, No Drawings

RUBBER COMPOSITION COMPRISING AN EPOXY RESIN AND A POLYIMINE HARDENER

This application is a 371 national phase entry of PCT/EP2013/065634, filed 24 Jul. 2013, which claims benefit to French Patent Application No. 1257196, filed 25 Jul. 2012, the contents of which are incorporated herein by reference for all purposes.

BACKGROUND

1. Field

The present disclosure relates to rubber compositions intended in particular for the manufacture of tires or semi-finished products for tires, in particular rubber compositions exhibiting a high stiffness.

2. Description of Related Art

It is known to use, in some parts of the tires, rubber compositions exhibiting a high stiffness during small strains of the tire (cf. WO 02/10269). Resistance to small strains is one of the properties which a tire has to exhibit in order to respond to the stresses to which it is subjected.

This stiffening can be obtained by increasing the content of reinforcing filler or by incorporating certain reinforcing resins in the constituent rubber compositions of the parts of the tire.

However, in a known way, the increase in the stiffness of a rubber composition by increasing the content of filler can be disadvantageous to the hysteresis properties and thus rolling resistance properties of the tires. In point of fact, it is an ongoing aim to lower the rolling resistance of tires in order to reduce the consumption of fuel, for economic and environmental purposes.

Conventionally, this increase in the stiffness is obtained by incorporating reinforcing resins based on a methylene acceptor/donor system. The terms "methylene acceptor" and "methylene donor" are well-known to a person skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulphur network, on the other hand (if the crosslinking agent is sulphur). The methylene acceptor described above is combined with a hardener, capable of crosslinking or curing it, also commonly known as "methylene donor". Crosslinking of the resin is then brought about during the curing of the rubber matrix by formation of methylene bridges (—CH$_2$—) between the carbons in the ortho and/or para positions of the phenolic nuclei of the resin and the methylene donor, thus creating a three-dimensional resin network.

The methylene donors conventionally used in rubber compositions for tires are hexamethylenetetramine (abbreviated to HMT) or hexamethoxymethylmelamine (abbreviated to HMMM or H3M) or hexaethoxymethylmelamine.

However, it is desirable to find alternatives to the conventional reinforcing resins.

Previously, the Applicant Companies have discovered, during their research studies, that the normal reinforcing resins can advantageously be replaced by an epoxy resin with a diamine as hardener. The use of this pair of epoxy resin and diamine reactants makes it possible to obtain rubber compositions exhibiting a greater low-strain stiffness, in comparison with conventional rubber compositions, without significantly damaging the hysteresis, as described in the document FR 2 951 182.

SUMMARY

On continuing their research studies, the Applicant Companies have now found that the diamine hardener of the epoxy resin can advantageously be replaced by a polyimine hardener, that is to say comprising several imine functional groups, that is to say an aldimine and/or ketimine hardener. This is because the compositions provided with a reinforcing resin based on epoxy resin and a polyimine hardener surprisingly exhibit improved processability properties, in particular scorch safety, while retaining stiffness and hysteresis properties similar to those of the compositions comprising a reinforcing resin of the prior art.

Consequently, a first subject-matter of the invention relates to a rubber composition based on at least one diene elastomer, a reinforcing filler, a crosslinking system, an epoxy resin, at a content within a range extending from 1 to 20 phr, and a polyimine hardener, at a content within a range extending from 0.2 to 15 phr.

Preferably, a subject-matter of the invention is a rubber composition as defined above, in which the elastomer is selected from the group consisting of natural rubber, synthetic polyisoprenes, polybutadienes, butadiene copolymers, isoprene copolymers and the mixtures of these elastomers.

Preferably again, a subject-matter of the invention is a rubber composition as defined above, in which the content of epoxy resin is within a range extending from 3 to 20 phr, more preferably from 5 to 18 phr.

More preferably, a subject-matter of the invention is a rubber composition as defined above, in which the hardener is a polyimine of formula:

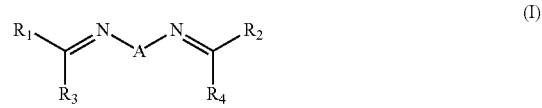

(I)

in which:

R$_1$ and R$_2$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted, R$_3$ and R$_4$ independently represent identical or different groups chosen from hydrogen or alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted, A represents a hydrocarbon group comprising at least 2 carbon atoms, optionally interrupted by heteroatoms and optionally substituted.

More preferably still, a subject-matter of the invention is a rubber composition as defined above, in which R$_1$ and R$_2$ independently represent identical or different groups chosen from alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted.

Preferably, a subject-matter of the invention is a rubber composition as defined above, in which $R_1$ and $R_2$ each represent an aryl radical having from 6 to 24 carbon atoms and more preferably still a phenyl radical which is optionally substituted.

Preferably, a subject-matter of the invention is a rubber composition as defined above, in which $R_3$ and $R_4$ independently represent identical or different groups chosen from hydrogen or alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted.

More preferably, a subject-matter of the invention is a rubber composition as defined above, in which $R_3$ and $R_4$ independently represent a hydrogen atom or an aryl radical having from 6 to 24 carbon atoms.

Preferably again, a subject-matter of the invention is a rubber composition as defined above, in which $R_3$ and $R_4$ independently represent a hydrogen or a phenyl radical which is optionally substituted.

Preferably, a subject-matter of the invention is a rubber composition as defined above, in which A represents a hydrocarbon group comprising from 2 to 18 carbon atoms, optionally interrupted by heteroatoms and optionally substituted.

Preferably again, a subject-matter of the invention is a rubber composition as defined above, in which A represents an alkylene or cycloalkylene group comprising from 2 to 18 carbon atoms, optionally interrupted by heteroatoms and optionally substituted, or an aralkylene comprising from 8 to 18 carbon atoms, optionally interrupted by heteroatoms and optionally substituted, it being understood that, in the alkylene or aralkylene carbon chains optionally interrupted by heteroatoms and optionally substituted, there may be double or triple bonds between the carbon atoms.

Preferably, a subject-matter of the invention is a rubber composition as defined above, in which A represents an alkylene group comprising from 2 to 12 carbon atoms, more preferably from 2 to 8 carbon atoms, this radical optionally being substituted.

More preferably, a subject-matter of the invention is a rubber composition as defined above, in which at least one of the $R_1$, $R_2$, $R_3$, $R_4$ and A groups is substituted by at least one radical chosen from alkyl, cycloalkylalkyl, aryl, aralkyl, hydroxyl, alkoxy, amino, carboxyl and carbonyl radicals.

Preferably again, a subject-matter of the invention is a rubber composition as defined above, in which A is substituted by one or more imine entities of formula (II) and/or by one or more radicals chosen from alkyl, cycloalkyl, cycloalkylalkyl or aralkyl radicals, themselves substituted by one or more imine entities of formula (II):

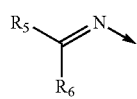

(II)

in which $R_5$ is defined as $R_1$ and $R_2$ above are defined and $R_6$ is defined as $R_3$ and $R_4$ above are defined, the arrow representing the point of attachment of the radical or radicals of formula (II) with the atom which bears them.

Preferably, a subject-matter of the invention is a rubber composition as defined above, in which the radical A is not substituted.

More preferably, a subject-matter of the invention is a rubber composition as defined above, in which the $R_1$, $R_2$, $R_3$, $R_4$ and A groups are not substituted.

Very preferably, a subject-matter of the invention is a rubber composition as defined above, in which the hardener is a polyaldimine.

Preferably again, a subject-matter of the invention is a rubber composition as defined above, in which the hardener is a polyketimine.

More preferably still, a subject-matter of the invention is a rubber composition as defined above, in which the content of hardener is within a range extending from 0.5 to 12 phr and more preferably from 2 to 10 phr.

Preferably, a subject-matter of the invention is a rubber composition as defined above, in which the reinforcing filler comprises carbon black, silica or a mixture of carbon black and silica.

More preferably, a subject-matter of the invention is a rubber composition as defined above, in which the amount of reinforcing filler is between 20 and 200 phr.

The invention also relates, in an embodiment, to a tire comprising a rubber composition as defined above.

The invention also relates, in an embodiment, to a finished or semi-finished rubber article comprising a rubber composition as defined above.

The invention also relates, in an embodiment, to a process for preparing a rubber composition as defined above, comprising the following stages:
  incorporating, in a diene elastomer, during a first stage ("non-productive" stage), a reinforcing filler, between 1 and 20 phr of an epoxy resin and between 0.2 and 15 phr of a polyimine hardener, everything being kneaded thermomechanically until a maximum temperature of between 110° C. and 190° C. is reached;
  cooling the combined mixture to a temperature of less than 100° C.;
  subsequently incorporating, during a second stage ("productive" stage), a crosslinking system;
  kneading everything up to a maximum temperature of less than 110° C.

The invention also relates, in an embodiment, to a process for preparing a rubber composition as defined above, comprising the following stages:
  incorporating, in a diene elastomer, during a first stage ("non-productive" stage), a reinforcing filler, everything being kneaded thermomechanically until a maximum temperature of between 110° C. and 190° C. is reached;
  cooling the combined mixture to a temperature of less than 100° C.;
  subsequently incorporating, during a second stage ("productive" stage), a crosslinking system, between 1 and 20 phr of an epoxy resin and between 0.2 and 15 phr of a polyimine hardener;
  kneading everything up to a maximum temperature of less than 110° C.

The invention also relates to a process for preparing a rubber composition as defined above, comprising the following stages:
  incorporating, in a diene elastomer, during a first stage ("non-productive" stage), a reinforcing filler and between 1 and 20 phr of an epoxy resin, everything being kneaded thermomechanically until a maximum temperature of between 110° C. and 190° C. is reached;

cooling the combined mixture to a temperature of less than 100° C.;

subsequently incorporating, during a second stage ("productive" stage), a crosslinking system and between 0.2 and 15 phr of a polyimine hardener;

kneading everything up to a maximum temperature of less than 110° C.

The invention also relates, in an embodiment, to a process for preparing a rubber composition as defined above, comprising the following stages:

incorporating, in a diene elastomer, during a first stage ("non-productive" stage), a reinforcing filler and between 0.2 and 15 phr of a polyimine hardener, everything being kneaded thermomechanically until a maximum temperature of between 110° C. and 190° C. is reached;

cooling the combined mixture to a temperature of less than 100° C.;

subsequently incorporating, during a second stage ("productive" stage), a crosslinking system and between 1 and 20 phr of an epoxy resin;

kneading everything up to a maximum temperature of less than 110° C.

Another subject-matter of the invention is finished or semi-finished rubber articles comprising a rubber composition in accordance with an embodiment of the invention and in particular a tread.

The tires in accordance with embodiments of the invention are intended in particular for passenger vehicles as well for two-wheel vehicles (motorcycles, bicycles), industrial vehicles chosen from vans, "heavy-duty vehicles", i.e. underground, bus, heavy road transport vehicles (lorries, tractors, trailers) or off-road vehicles, heavy agricultural vehicles or earthmoving equipment, planes, and other transportation or handling vehicles.

DETAILED DESCRIPTION OF SPECIFIC EMBODIMENTS

The invention and its embodiments and advantages will be easily understood in the light of the description and implementational examples which follow.

I. Tests

The rubber compositions are characterized, before and after curing, as indicated below.

I.1. Scorch Time (or Fixing Time)

The measurements are carried out at 115° C., in accordance with French Standard NF T 43-005. The change in the consistometric index as a function of time makes it possible to determine the scorch time of the rubber compositions, assessed in accordance with the abovementioned standard, by the parameter T5 (case of a large rotor), expressed in minutes, and defined as being the time necessary to obtain an increase in the consistometric index (expressed in MU) of 5 units above the minimum value measured for this index.

I.2. Mooney Viscosity (or Mooney Plasticity)

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.meter).

I.3. Dynamic Properties

The dynamic properties G* (10%) and tan(δ)max at 40° C. are measured on a viscosity analyser (Metravib VA4000) according to Standard ASTM D 5992-96. The response of a sample of vulcanized composition (cylindrical test specimen with a thickness of 4 mm and a cross-section of 400 mm$^2$), subjected to a simple alternating sinusoidal shear stress, at a frequency of 10 Hz, under standard temperature conditions (23° C.) according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G* and the loss factor tan(δ). The maximum value of tan(δ) observed, denoted tan(δ)max, and the complex dynamic shear modulus G* (10%) at 10% strain, at 40° C., are shown for the return cycle.

It should be remembered that, in a way well-known to a person skilled in the art, the value of tan(δ)max at 40° C. is representative of the hysteresis of the material and thus of the rolling resistance: the lower tan(δ)max at 40° C., the more the rolling resistance is reduced.

II. Conditions for the Implementation of the Invention

The rubber composition according to an embodiment of the invention is based on at least one diene elastomer, a reinforcing filler, a crosslinking system, an epoxy resin, at a content within a range extending from 1 to 20 phr, and a polyimine hardener, at a content within a range extending from 0.2 to 15 phr.

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

II.1. Diene Elastomer

The rubber composition according to the invention comprises a diene elastomer.

A "diene" elastomer or rubber should be understood, in a known way, as meaning an (one or more is understood) elastomer resulting at least in part (i.e., a homopolymer or a copolymer) from diene monomers (monomers carrying two conjugated or non-conjugated carbon-carbon double bonds).

These diene elastomers can be classified into two categories: "essentially unsaturated" or "essentially saturated". Generally, "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood to mean in particular a diene elastomer having a content of units of diene origin (conjugated dienes) which is greater than 50%.

Given these definitions, diene elastomer capable of being used in the compositions in accordance with the invention is understood more particularly to mean:

any homopolymer obtained by polymerization of a conjugated diene monomer having from 4 to 12 carbon atoms;

any copolymer obtained by copolymerization of one or more conjugated dienes with one another or with one or more vinylaromatic compounds having from 8 to 20 carbon atoms;

a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, statistical, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as benzophenone, for example; mention may be made, for example, for coupling to a reinforcing inorganic filler, such as silica, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

To summarize, the diene elastomer of the composition in accordance with the an embodiment of the invention is preferably selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

"Isoprene elastomer" is understood to mean, in a known way, an isoprene homopolymer or copolymer, in other words a diene elastomer selected from the group consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

Preferably, according to an embodiment of the invention, the elastomers are chosen from the isoprene elastomers described above and more preferably the composition according to an embodiment of the invention predominantly comprises natural rubber (NR), alone or as a blend with one or more other diene elastomers.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer of between 110° C. and −80° C., more preferably between 105° C. and 90° C. The high Tg elastomer is preferably selected from the group consisting of S-SBRs, E-SBRs, natural rubber, synthetic polyisoprenes (exhibiting a content (mol %) of cis-1,4-enchainments preferably of greater than 95%), BIRs, SIRs, SBIRs, and the mixtures of these elastomers. The low Tg elastomer preferably comprises butadiene units according to a content (mol %) at least equal to 70%; it preferably consists of a polybutadiene (BR) exhibiting a content (mol %) of cis-1,4-enchainments of greater than 90%.

According to another specific embodiment of the invention, the rubber composition comprises, for example, from 30 to 100 phr, in particular from 50 to 100 phr, of a high Tg elastomer as a blend with from 0 to 70 phr, in particular from 0 to 50 phr, of a low Tg elastomer; according to another example, it comprises, for the totality of the 100 phr, one or more SBRs prepared in solution.

According to another specific embodiment of the invention, the diene elastomer of the composition according to the invention comprises a blend of a BR (as low Tg elastomer) exhibiting a content (mol %) of cis-1,4-enchainments of greater than 90% with one or more S-SBRs or E-SBRs (as high Tg elastomer(s)).

The compositions of embodiments of the invention can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

II.2. Reinforcing Filler

Use may be made of any type of reinforcing filler known for its abilities to reinforce a rubber composition which can be used for the manufacture of tires, for example an organic filler, such as carbon black, a reinforcing inorganic filler, such as silica, or also a blend of these two types of filler, in particular a blend of carbon black and silica.

All carbon blacks, in particular blacks of the HAF, ISAF or SAF type, conventionally used in tires ("tire-grade" blacks), are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, according to the targeted applications, of the blacks of higher series (for example, N660, N683 or N772). The carbon blacks might, for example, be already incorporated in an isoprene elastomer in the form of a masterbatch (see, for example, Application WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

"Reinforcing inorganic filler" should be understood, in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (OH) groups at its surface.

The physical state under which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

The reinforcing inorganic filler used, in particular if it is silica, preferably has a BET specific surface of between 45 and 400 $m^2/g$, more preferably of between 60 and 300 $m^2/g$.

Preferably, the content of total reinforcing filler (carbon black and/or reinforcing inorganic filler, such as silica) is between 20 and 200 phr, more preferably between 30 and 150 phr, the optimum being, in a known way, different depending on the specific applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy-duty vehicle.

According to a preferred embodiment of the invention, use is made of a reinforcing filler comprising between 30 and 150 phr, more preferably between 50 and 120 phr, of organic filler, particularly of carbon black, and optionally silica; the silica, when it is present, is preferably used at a content of less than 20 phr, more preferably of less than 10 phr (for example between 0.1 and 10 phr). This preferred embodiment is particularly preferred when the predominant elastomer of the composition is an isoprene rubber, more particularly natural rubber.

Alternatively, according to another preferred embodiment of the invention, use is made of a reinforcing filler comprising between 30 and 150 phr, more preferably between 50 and 120 phr, of inorganic filler, particularly of silica, and optionally carbon black; the carbon black, when it is present, is preferably used at a content of less than 20 phr, more preferably of less than 10 phr (for example between 0.1 and 10 phr). This preferred embodiment is particularly preferred when the rubber composition comprises a blend of a (one or more) "high Tg" diene elastomer exhibiting a Tg of between −70° C. and 0° C. and of a (one or more) "low Tg" diene elastomer of between −110° C. and −80° C.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (I):

Z-A-S$_x$-A-Z, in which:    (I)

x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);
Z corresponds to one of the formulae below:

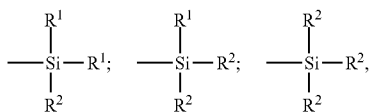

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula [($C_2H_5O)_3Si(CH_2)_3S_2]_2$, or bis(triethoxysilylpropyl) disulphide, abbreviated to TESPD, of formula [($C_2H_5O)_3Si(CH_2)_3S]_2$. Mention will also be made, as preferred examples, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in Patent Application WO 02/083782 (or US 2004/132880).

Mention will in particular be made, as coupling agents other than an alkoxysilane polysulphide, of bifunctional POSs (polyorganosiloxanes) or else of hydroxysilane polysulphides ($R^2$=OH in the above formula I), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions in accordance with an embodiment of the invention, the content of coupling agent is preferably between 4 and 12 phr, more preferably between 4 and 8 phr.

A person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to form the bond between the filler and the elastomer.

II.3. Epoxy Resin

The epoxy resins which are used in an embodiment of the present invention include all polyepoxy compounds, such as aromatic epoxy compounds, alicyclic epoxy compounds and aliphatic epoxy compounds. In particular among aromatic epoxy compounds, preference is given to epoxy novolac resins, 2,2-bis[4-(glycidyloxy)phenyl]propane, poly[(o-cresyl glycidyl ether)-co-formaldehyde] and the mixtures of these compounds. Mention may be made, by way of example, of the resins "ECN1273", "ECN1280", "ECN1299" and "ECN 9511", sold by Huntsman, or the resins "DER 332", "DER 354", "DER 383", "DEN 425", "DEN 431", "DEN 438" and "DEN 439", sold by Dow Chemicals.

The amount of epoxy resin is within a range extending from 1 to 20 phr; below the minimum indicated, the targeted technical effect is insufficient whereas, above the maximum indicated, risks arise of an excessively great increase in the stiffness and of the hysteresis being excessively disadvantaged. For all these reasons, an amount within a range extending from 3 to 20 phr is preferably chosen and more preferably from 5 to 18 phr.

II.4. Hardener

The resin described above is used in combination with a hardener capable of crosslinking or curing it. According to an embodiment of the invention and in combination with an epoxy resin, this hardener is a polyimine compound, that is to say a compound comprising several imine functional groups, such as aldimines and/or ketimines. In particular, it can be a polyaldimine compound, a polyketimine compound, a compound bearing both one or more aldimine functional groups and one or more ketimine functional groups or a mixture of these.

The crosslinking of the resin is brought about, during the curing of the rubber matrix, by formation of covalent bonds between the resin and the imine functional groups of the hardener.

The amount of hardener is preferably within a range extending from 0.2 to 15 phr; below the minimum indicated, the targeted technical effect has proved to be insufficient whereas, above the maximum indicated, risks arise of the processing in the raw state of the compositions being disadvantaged. Preferably, the content of hardener is within a range extending from 0.5 to 12 phr and more preferably still from 2 to 10 phr.

The compositions of an embodiment of the invention use a hardener which can be a polyimine. It can be any chemical compound having at least two imine functional groups. These compounds are easily identified by a person skilled in the art.

The polyimines include in particular and preferably the polyimine compounds of general formula (I):

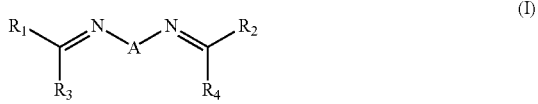

in which:
R$_1$ and R$_2$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted,
R$_3$ and R$_4$ independently represent identical or different groups chosen from hydrogen or alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted,
A represents a hydrocarbon group comprising at least 2 carbon atoms (preferably from 2 to 18), optionally interrupted by heteroatoms and optionally substituted.

Preferably, R$_1$ and R$_2$ independently represent identical or different groups chosen from alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted. More preferably, R$_1$ and R$_2$ each represent an aryl radical having from 6 to 24 carbon atoms and more preferably still a phenyl radical which is optionally substituted.

R$_3$ and R$_4$ independently represent identical or different groups chosen from hydrogen or alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted. More preferably, R$_3$ and R$_4$ independently represent a hydrogen atom or an aryl radical having from 6 to 24 carbon atoms and more preferably still a hydrogen or a phenyl radical which is optionally substituted.

Preferably again, A represents a hydrocarbon group comprising from 2 to 18 carbon atoms, optionally interrupted by heteroatoms and optionally substituted. More preferably, A represents an alkylene or cycloalkylene group comprising from 2 to 18 carbon atoms, optionally interrupted by heteroatoms and optionally substituted, or an aralkylene comprising from 8 to 18 carbon atoms, optionally interrupted by heteroatoms and optionally substituted, it being understood that, in the alkylene or aralkylene carbon chains optionally interrupted by heteroatoms and optionally substituted, there may be double or triple bonds between the carbon atoms. Very preferably, A represents an alkylene group comprising from 2 to 12 carbon atoms, more preferably from 2 to 8 carbon atoms (in particular 6 carbon atoms), this radical optionally being substituted.

As indicated in the preceding sections, the R$_1$, R$_2$, R$_3$, R$_4$ and A groups can optionally be interrupted by heteroatoms, such as S, O or N, preferably N or O. Within the meaning of the present invention, the term "group interrupted by heteroatoms" should be understood as meaning a group which comprises, between its end atoms (which are carbon atoms, as defined by the definitions of the hydrocarbon groups in question), one or more heteroatoms as provided for above. Preferably, the R$_1$, R$_2$, R$_3$, R$_4$ and A groups are not interrupted by heteroatoms.

As indicated in the preceding sections, the R$_1$, R$_2$, R$_3$, R$_4$ and A groups can be substituted. The radicals substituting these groups can be ordinary radicals known to a person skilled in the art, such as alkyl (preferably methyl, tert-butyl or isopropyl), cycloalkyl (preferably cyclohexyl), cycloalkylalkyl, aryl, aralkyl, hydroxyl, alkoxy, amino, carboxyl or carbonyl.

Furthermore, A can also be substituted by one or more imine entities of formula (II) and/or by one or more radicals, such as alkyl, cycloalkyl, cycloalkylalkyl or aralkyl radicals, themselves substituted by one or more imine entities of formula (II):

in which R$_5$ is defined as R$_1$ and R$_2$ above are defined and R$_6$ is defined as R$_3$ and R$_4$ above are defined, the arrow representing the point of attachment of the radical or radicals of formula (II) with the atom which bears them.

Thus, the compounds of formula (I) comprise at least two imine entities and can comprise more of them, for example three or four, depending on the nature of the radicals substituting the A group.

The imine entities of the compounds of formula (I) can be aldimines and/or ketimines, according to whether R$_3$, R$_4$ and R$_6$ are hydrogen atoms or a group of another nature as defined above.

According to a preferred embodiment, the compounds of formula (I) comprise two imine entities, that is to say that the A group is not substituted by radicals comprising one or more imine entities of formula (II) as defined above.

According to another preferred embodiment, the compounds of formula (I) comprise more than two imine entities, that is to say that the A group is substituted by a radical comprising one or more imine entities of formula (II) as defined above.

More preferably, these polyimine compounds are chosen from the polyaldimine or polyketimine compounds presented below, or also from the following compounds:
N,N'-bis[phenylmethylene]ethane-1,2-diamine,
N,N'-bis[phenylmethylene]hexane-1,6-diamine,
N,N'-bis[phenylmethylene]octane-1,8-diamine,
N,N'-bis[phenylmethylene]cyclohexane-1,4-diamine,
N,N'-bis[phenylmethylene]cyclohexane-1,2-diamine,
N,N'-bis[phenylmethylene]-3-[9-(3-aminopropyl)-1,5,7,11-tetraoxaspiro[5.5]undec-3-yl]propan-1-amine,
N,N'-bis[4-methoxyphenylmethylene]-3-[9-(3-aminopropyl)-1,5,7,11-tetraoxaspiro[5.5]undec-3-yl]propan-1-amine,
N,N,N-tris(2-{[phenylmethylene]amino}ethyl)amine,
N,N'-bis[(4-di(tert-butyl)-4-methylphenyl)methylene]hexane-1,6-diamine,
N,N'-bis[mesitylmethylene]hexane-1,6-diamine,
N,N'-bis[(4-methylphenyl)methylene]hexane-1,6-diamine,
N,N'-bis[(4-diethylaminophenyl)methylene]octane-1,8-diamine,
N,N'-bis[mesitylmethylene]octane-1,8-diamine,
N,N'-bis[(4-di(tert-butyl)-4-methylphenyl)methylene]hexane-1,6-diamine,
N,N'-bis[(4-di(tert-butyl)-4-methylphenyl)methylene]hexane-1,6-diamine,
N,N'-bis[(2-diethylaminophenyl)methylene]hexane-1,6-diamine,
N,N'-bis[(2-di(tert-butyl)-4-methylphenyl)methylene]hexane-1,6-diamine,
N,N'-bis[(2,4,6-triisopropylphenyl)methylene]hexane-1,6-diamine,
N,N'-bis[(2,4,6-tri(tert-butyl)phenyl)methylene]hexane-1,6-diamine,
N,N'-bis[(2,4,6-tricyclohexylphenyl)methylene]hexane-1,6-diamine,
N,N'-bis[(2,6-diisopropyl-4-methylphenyl)methylene]hexane-1,6-diamine,
N,N'-bis[(2,6-di(tert-butyl)-4-methylphenyl)methylene]hexane-1,6-diamine,
N,N'-bis[(2,6-dicyclohexyl-4-methylphenyl)methylene]hexane-1,6-diamine,
N,N'-bis(phenylmethylene)-1,4-benzenedimethanamine.
N,N'-bis(4-methylpentan-2-ylidene)hexane-1,6-diamine,
N,N'-bis(2,6-dimethylheptan-4-ylidene)hexane-1,6-diamine,
N,N'-bis(2,4-dimethylpentan-3-ylidene)hexane-1,6-diamine,
N,N'-bis(4-methylpentan-2-ylidene)octane-1,8-diamine,
N,N'-bis(2,6-dimethylheptan-4-ylidene)octane-1,8-diamine,
N,N'-bis(2,4-dimethylpentan-3-ylidene)octane-1,8-diamine,
N,N'-dicyclopentylidenehexane-1,6-diamine,
N,N'-dicyclopentylideneoctane-1,8-diamine,
N,N'-dicyclohexylidenehexane-1,6-diamine,
N,N'-dicyclohexylideneoctane-1,8-diamine,
N,N'-bis(4-methylpentan-2-ylidene)cyclohexane-1,4-diamine,
N,N'-bis(4-methylpentan-2-ylidene)cyclohexane-1,2-diamine,
N,N'-bis(2,6-dimethylheptan-4-ylidene)cyclohexane-1,4-diamine,
N,N'-bis(2,6-dimethylheptan-4-ylidene)cyclohexane-1,2-diamine,
N,N'-dicyclohexylidenecyclohexane-1,4-diamine,
N,N'-dicyclohexylidenecyclohexane-1,2-diamine,
N-(4-methylpentan-2-ylidene)-N',N'-bis((4-methylpentan-2-ylideneamino)ethyl)ethane-1,2-diamine,
N-(2,6-dimethylheptan-4-ylidene)-N',N'-bis(2-(2,6-dimethylheptan-4-ylideneamino)ethyl)ethane-1,2-diamine.

Use is preferably made, as polyimine compounds, of diimine, triimine and tetraimine compounds. The polyimine compounds can, for example, be synthesized by condensing an amine with an aldehyde and/or a ketone. This method of preparation of imines is described in "Advanced Organic Chemistry, Part B: Reactions and Synthesis" by F. A. Carey and R. J. Sundberg, 4th Edition, pp 31-33, and in "Advanced Organic Chemistry, Reactions, Mechanisms, and Structure" by J. March, 5th Edition, pp 1185-1187, and in the references cited by these works.

For example, if diimines are considered, those of general formula (I) can in particular be prepared by the condensation of a diamine and of one or two carbonyl compounds chosen from aldehydes and ketones, simultaneously or successively, according to whether the molecule is symmetrical or non-symmetrical.

The same type of reaction is applicable to the synthesis of polyimines by using the appropriate starting reactants, for example triamines for triimines of general formula (I), tetramines for tetraimines of general formula (I), and the like.

As regards the compounds of general formula (I), the polyamines and the aldehydes used for the synthesis of these products are the same as those described below for the synthesis of polyaldimines and the ketones are the same as those used for the synthesis of the polyketimines also described below.

II.4.1. Polyaldimine Hardener

In the case, which is preferred, where the $R_3$ and $R_4$ groups of the above formula (I) are hydrogen atoms, the compositions of the invention use a hardener which is a polyaldimine. In this case, it can be any chemical compound having at least two aldimine functional groups. These compounds are easily identified by a person skilled in the art.

The polyaldimines include in particular a polyaldimine compound of general formula (III):

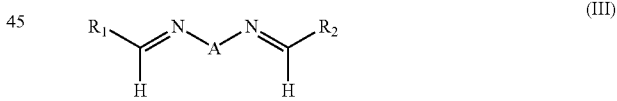

in which:
$R_1$ and $R_2$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted,
A represents a hydrocarbon group comprising at least 2 carbon atoms (preferably from 2 to 18), optionally interrupted by heteroatoms and optionally substituted.
Preferably, $R_1$ and $R_2$ independently represent identical or different groups chosen from alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted. More preferably, $R_1$ and $R_2$ each represent an aryl radical having from 6 to 24 carbon atoms and more preferably still a phenyl radical which is optionally substituted.

Preferably again, A represents a hydrocarbon group comprising from 2 to 18 carbon atoms, optionally interrupted by heteroatoms and optionally substituted. More preferably, A represents an alkylene or cycloalkylene group comprising from 2 to 18 carbon atoms, optionally interrupted by heteroatoms and optionally substituted, or an aralkylene comprising from 8 to 18 carbon atoms, optionally interrupted by heteroatoms and optionally substituted, it being understood that, in the alkylene or aralkylene carbon chains optionally interrupted by heteroatoms and optionally substituted, there may be double or triple bonds between the carbon atoms. Very preferably, A represents an alkylene group comprising from 2 to 12 carbon atoms, more preferably from 2 to 8 carbon atoms (in particular 6 carbon atoms), this radical optionally being substituted.

As indicated in the preceding sections, the $R_1$, $R_2$ and A groups can optionally be interrupted by heteroatoms, such as S, O or N, preferably N or O. Within the meaning of the present invention, the term "group interrupted by heteroatoms" should be understood as meaning a group which comprises, between its end atoms (which are carbon atoms, as defined by the definitions of the hydrocarbon groups in question), one or more heteroatoms as provided for above. Preferably, the $R_1$, $R_2$ and A groups are not interrupted by heteroatoms.

As indicated in the preceding sections, the $R_1$, $R_2$ and A groups can be substituted. The radicals substituting these groups can be ordinary radicals known to a person skilled in the art, such as alkyl (preferably methyl, tert-butyl or isopropyl), cycloalkyl (preferably cyclohexyl), cycloalkylalkyl, aryl, aralkyl, hydroxyl, alkoxy, amino, carboxyl or carbonyl.

Furthermore, A can also be substituted by one or more aldimine entities of formula (IV) and/or by one or more radicals, such as alkyl, cycloalkyl, cycloalkylalkyl or aralkyl radicals, themselves substituted by one or more aldimine entities of formula (IV):

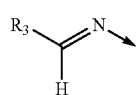

(IV)

in which $R_3$ is independently defined as $R_1$ and $R_2$ above are defined, the arrow representing the point of attachment of the radical or radicals of formula (IV) with the atom which bears them.

Thus, the compounds of formula (III) comprise at least two aldimine entities and can comprise more of them, for example three or four, depending on the nature of the radicals substituting the A group.

According to a preferred embodiment, the compounds of formula (III) comprise two aldimine entities, that is to say that the A group is not substituted by radicals comprising one or more aldimine entities of formula (IV) as defined above.

According to another preferred embodiment, the compounds of formula (III) comprise more than two aldimine entities, that is to say that the A group is substituted by a radical comprising one or more aldimine entities of formula (IV) as defined above.

More preferably, these polyaldimine compounds are chosen from the following compounds:
N,N'-bis[phenylmethylene]ethane-1,2-diamine,
N,N'-bis[phenylmethylene]hexane-1,6-diamine,
N,N'-bis[phenylmethylene]octane-1,8-diamine,
N,N'-bis[phenylmethylene]cyclohexane-1,4-diamine,
N,N'-bis[phenylmethylene]cyclohexane-1,2-diamine,
N,N'-bis[phenylmethylene]-3-[9-(3-aminopropyl)-1,5,7,11-tetraoxaspiro[5.5]undec-3-yl]propan-1-amine,
N,N'-bis[4-methoxyphenylmethylene]-3-[9-(3-aminopropyl)-1,5,7,11-tetraoxaspiro[5.5]undec-3-yl]propan-1-amine,
N,N,N-tris(2-{[phenylmethylene]amino}ethyl)amine,
N,N'-bis[(4-di(tert-butyl)-4-methylphenyl)methylene]hexane-1,6-diamine,
N,N'-bis[mesitylmethylene]hexane-1,6-diamine,
N,N'-bis[(4-methylphenyl)methylene]hexane-1,6-diamine,
N,N'-bis[(4-diethylaminophenyl)methylene]octane-1,8-diamine,
N,N'-bis[mesitylmethylene]octane-1,8-diamine,
N,N'-bis[(4-methylphenyl)methylene]octane-1,8-diamine,
N,N'-bis[(4-methoxyphenyl)methylene]hexane-1,6-diamine,
N,N'-bis[(2-diethylaminophenyl)methylene]hexane-1,6-diamine,
N,N'-bis[(2-di(tert-butyl)-4-methylphenyl)methylene]hexane-1,6-diamine,
N,N'-bis[(2,4,6-triisopropylphenyl)methylene]hexane-1,6-diamine,
N,N'-bis[(2,4,6-tri(tert-butyl)phenyl)methylene]hexane-1,6-diamine,
N,N'-bis[(2,4,6-tricyclohexylphenyl)methylene]hexane-1,6-diamine,
N,N'-bis[(2,6-diisopropyl-4-methylphenyl)methylene]hexane-1,6-diamine,
N,N'-bis[(2,6-di(tert-butyl)-4-methylphenyl)methylene]hexane-1,6-diamine,
N,N'-bis[(2,6-dicyclohexyl-4-methylphenyl)methylene]hexane-1,6-diamine,
N,N'-bis(phenylmethylene)-1,4-benzenedimethanamine.

Use is preferably made, as polyaldimine compounds, of dialdimine, trialdimine and tetraaldimine compounds. These compounds and their process of preparation are described in the state of the art essentially either for improving the abrasion resistance of rubber compositions intended for the manufacture of tires for vehicles, and mention may be made, in this regard, of Patent Application JP2006063206A1, or for the preparation of resins according to the process described in U.S. Pat. No. 3,668,183.

The polyaldimine compounds can, for example, be synthesized by condensing an amine with an aldehyde. This method of preparation of aldimines is described in "Advanced Organic Chemistry, Part B: Reactions and Synthesis" by F. A. Carey and R. J. Sundberg, 4th Edition, pp 31-33, and in "Advanced Organic Chemistry, Reactions, Mechanisms, and Structure" by J. March, 5th Edition, pp 1185-1187, and in the references cited by these works.

For example, if dialdimines are considered, those of general formula (III) can in particular be prepared by the condensation of a diamine and of one or two aldehydes, simultaneously or successively, according to whether the molecule is symmetrical or non-symmetrical.

The same type of synthesis is applicable to the synthesis of polyaldimines by using the appropriate starting reactants, for example triamines for trialdimines of general formula (III), tetramines for tetraaldimines of general formula (III), and the like.

As regards the compounds of general formula (III), the amines used for the synthesis of these products are compounds comprising at least two amine functional groups. As such, these compounds can be diamines or polyamines, such as triamines, tetramines, and the like.

Mention may be made, as examples of diamines of use in the synthesis of dialdimines for embodiments of the invention, for example, of ethylenediamine, 1,2-propylenediamine, 3,3'-dimethyl-4,4'-diaminodicyclohexylmethane, 4,4'-diaminodicyclohexylmethane, isophoronediamine, neopentanediamine (2,2-dimethylpropane-1,3-diamine), 1,8-octamethylenediamine, 1,3-diaminopropane, 1,6-hexamethylenediamine, 1,2-diaminocyclohexane, 1,3-diaminocyclohexane, 1,4-diaminocyclohexane, and preferably 1,8-octamethylenediamine, 1,6-hexamethylenediamine, 1,2-diaminocyclohexane, 1,4-diaminocyclohexane or 3-[9-(3-aminopropyl)-1,5,7,11-tetraoxaspiro[5.5]undec-3-yl]propan-1-amine.

Mention may also be made, for example, of 4,7,10-trioxatridecane-1,13-diamine, 4,9-dioxadodecane-1,12-diamine, N-3-amine-(3-(2-aminoethylamino)propylamine), diethylenetriamine, dipropylenetriamine, N,N-bis(3-aminopropyl)methylamine, N-4-amine-(N,N'-bis(3-aminopropyl)ethylenediamine), 2,4-diamino-6-methyl-1,3,5-triazine, 2,4-diamino-6-phenyl-s-triazine, melamine, triethylenetetramine, tetraethylenepentamine, 2,2',2''-nitrilotriethylamine, 3,6-dioxaoctane-1,8-diamine, N,N,N-tris(2-aminoethyl)amine, bis(3-aminopropyl)tetramethyldisiloxane, 2-(2-aminoethoxyl)ethanamine, 3-{2-[2-(3-aminopropoxyl)ethoxy]ethoxy}propan-1-amine, 3-[4-(3-aminopropoxyl)phenoxy]propan-1-amine, 3-{2-(3-aminopropoxy)-1-[(3-aminopropoxy)methyl]ethoxy}propan-1-amine, 2-({2-[(2-aminophenyl)thio]ethyl}thio)aniline, 2-[(3-{[(2-aminophenyl)thio]methyl}-2,4,6-trimethylbenzypthio]aniline, 2-({4-[(2-aminophenyl)thio]but-2-enyl}thio)aniline; and preferably N,N-bis(2-aminoethyl)ethane-1,2-diamine.

Mention may be made, as examples of triamines and tetramines of use in the synthesis of trialdimines and tetraaldimines for embodiments of the invention, of tris(2-aminoethyl)amine, N,N-bis(2-aminoethyl)-N-{2-[(2-aminoethyl)amino]ethyl}amine, N,N-bis(2-aminoethyl)butane-1,4-diamine, N,N-bis(2-aminoethyl)-N-{2-[bis(2-aminoethyl)amino]ethyl}amine, 2-(aminomethyl)hexane-1,6-diamine, 2,2-bis(aminomethyl)hexane-1,6-diamine, 2,5-bis(aminomethyl)hexane-1,6-diamine, 3,5-diaminocyclohexylamine or 1-[3,5-bis(aminomethyl)phenyl]methanamine.

Mention may be made, as examples of aldehydes of use in the synthesis of trialdimines and tetraaldimines for embodiments of the invention, of benzaldehyde, 4-methoxybenzaldehyde, 4-(diethylamino)benzaldehyde, 4-methylbenzaldehyde, 2-methoxybenzaldehyde, 2,4-dimethoxybenzaldehyde, 2,4-di methyl benzaldehyde, 2,4,6-trimethylbenzaldehyde, 2,6-diisopropyl-4-methylbenzaldehyde, 2,4,6-triisopropylbenzaldehyde, 2,6-di(tert-butyl)-4-methylbenzaldehyde, 2,4,6-tri(tert-butyl)benzaldehyde, 1-naphthaldehyde, 2,6-dicyclohexyl-4-methylbenzaldehyde, 2,4,6-tricyclohexyl-4-methylbenzaldehyde, 1-naphthaldehyde, 2-naphthaldehyde, 1,1'-biphenyl-2-carbaldehyde, 1H-indole-5-carbaldehyde, 5-methylthiophene-2-carbaldehyde, 3,5-dimethyl-1H-pyrrole-2-carbaldehyde, 1-ethyl-1H-pyrrole-2-carbaldehyde, 1H-indole-3-carbaldehyde or quinoline-4-carbaldehyde.

II.4.2. Polyketimine Hardener

In the case, which is also preferred, where the $R_3$ and $R_4$ groups of the above formula (I) are not hydrogen atoms, the compositions of embodiments of the invention use a hardener which is a polyketimine. In this case, it can be any chemical compound having at least two ketimine functional groups. These compounds are easily identified by a person skilled in the art.

The polyketimines include in particular and preferably the polyketimine compounds of general formula (V):

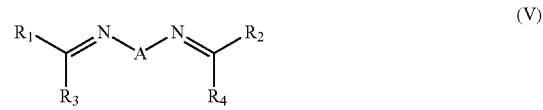

in which:
$R_1$, $R_2$, $R_3$ and $R_4$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted, A represents a hydrocarbon group comprising at least 2 carbon atoms (preferably from 2 to 18), optionally interrupted by heteroatoms and optionally substituted.

Preferably, $R_1$, $R_2$, $R_3$ and $R_4$ independently represent identical or different groups chosen from alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted. More preferably, $R_1$, $R_2$, $R_3$ and $R_4$ each represent an aryl radical having from 6 to 24 carbon atoms and more preferably still a phenyl radical which is optionally substituted.

Preferably again, A represents a hydrocarbon group comprising from 2 to 18 carbon atoms, optionally interrupted by heteroatoms and optionally substituted. More preferably, A represents an alkylene or cycloalkylene group comprising from 2 to 18 carbon atoms, optionally interrupted by heteroatoms and optionally substituted, or an aralkylene comprising from 8 to 18 carbon atoms, optionally interrupted by heteroatoms and optionally substituted, it being understood that, in the alkylene or aralkylene carbon chains optionally interrupted by heteroatoms and optionally substituted, there may be double or triple bonds between the carbon atoms. Very preferably, A represents an alkylene group comprising from 2 to 12 carbon atoms, more preferably from 2 to 8 carbon atoms (in particular 6 carbon atoms), this radical optionally being substituted.

As indicated in the preceding sections, the $R_1$, $R_2$, $R_3$, $R_4$ and A groups can optionally be interrupted by heteroatoms, such as S, O or N, preferably N or O. Within the meaning of the present invention, the term "group interrupted by heteroatoms" should be understood as meaning a group which comprises, between its end atoms (which are carbon atoms, as defined by the definitions of the hydrocarbon groups in question), one or more heteroatoms as provided for above. Preferably, the $R_1$, $R_2$, $R_3$, $R_4$ and A groups are not interrupted by heteroatoms.

As indicated in the preceding sections, the $R_1$, $R_2$, $R_3$, $R_4$ and A groups can be substituted. The radicals substituting these groups can be ordinary radicals known to a person skilled in the art, such as alkyl (preferably methyl, tert-butyl or isopropyl), cycloalkyl (preferably cyclohexyl), cycloalkylalkyl, aryl, aralkyl, hydroxyl, alkoxy, amino, carboxyl or carbonyl.

Furthermore, A can also be substituted by one or more ketimine entities of formula (VI) and/or by one or more radicals, such as alkyl, cycloalkyl, cycloalkylalkyl or aralkyl radicals, themselves substituted by one or more ketimine entities of formula (VI):

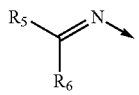

(VI)

in which $R_5$ and $R_6$ are independently defined as $R_1$, $R_2$, $R_3$ and $R_4$ above are defined, the arrow representing the point of attachment of the radical or radicals of formula (VI) with the atom which bears them.

Thus, the compounds of formula (V) comprise at least two ketimine entities and can comprise more of them, for example three or four, depending on the nature of the radicals substituting the A group.

According to a preferred embodiment, the compounds of formula (V) comprise two ketimine entities, that is to say that the A group is not substituted by radicals comprising one or more ketimine entities of formula (VI) as defined above.

According to another preferred embodiment, the compounds of formula (V) comprise more than two ketimine entities, that is to say that the A group is substituted by a radical comprising one or more ketimine entities of formula (VI) as defined above.

More preferably, these polyketimine compounds are chosen from the following compounds:
N,N'-bis(4-methylpentan-2-ylidene)hexane-1,6-diamine,
N,N'-bis(2,6-dimethylheptan-4-ylidene)hexane-1,6-diamine,
N,N'-bis(2,4-dimethylpentan-3-ylidene)hexane-1,6-diamine,
N,N'-bis(4-methylpentan-2-ylidene)octane-1,8-diamine,
N,N'-bis(2,6-dimethylheptan-4-ylidene)octane-1,8-diamine,
N,N'-bis(2,4-dimethylpentan-3-ylidene)octane-1,8-diamine,
N,N'-dicyclopentylidenehexane-1,6-diamine,
N,N'-dicyclopentylideneoctane-1,8-diamine,
N,N'-dicyclophexylidenehexane-1,6-diamine,
N,N'-dicyclophexylideneoctane-1,8-diamine,
N,N'-bis(4-methylpentan-2-ylidene)cyclohexane-1,4-diamine,
N,N'-bis(4-methylpentan-2-ylidene)cyclohexane-1,2-diamine,
N,N'-bis(2,6-dimethylheptan-4-ylidene)cyclohexane-1,4-diamine,
N,N'-bis(2,6-dimethylheptan-4-ylidene)cyclohexane-1,2-diamine,
N,N'-dicyclohexylidenecyclohexane-1,4-diamine,
N,N'-dicyclohexylidenecyclohexane-1,2-diamine,
N-(4-methylpentan-2-ylidene)-N',N'-bis((4-methylpentan-2-ylideneamino)ethyl)ethane-1,2-diamine,
N-(2,6-dimethylheptan-4-ylidene)-N',N'-bis(2-(2,6-dimethylheptan-4-ylideneamino)ethyl)ethane-1,2-diamine.

Use is preferably made, as polyketimine compounds, of diketimine, triketimine and tetraketimine compounds. The polyketimine compounds can, for example, be synthesized by condensing an amine with a ketone. This method of preparation of ketimines is described in "Advanced Organic Chemistry, Part B: Reactions and Synthesis" by F. A. Carey and R. J. Sundberg, 4th Edition, pp 31-33, and in "Advanced Organic Chemistry, Reactions, Mechanisms, and Structure" by J. March, 5th Edition, pp 1185-1187, and in the references cited by these works.

For example, if diketimines are considered, those of general formula (IV) can in particular be prepared by the condensation of a diamine and of one or two ketones, simultaneously or successively, according to whether the molecule is symmetrical or non-symmetrical.

The same type of reaction is applicable to the synthesis of polyketimines by using the appropriate starting reactants, for example triamines for triketimines of general formula (V), tetramines for tetraketimines of general formula (V), and the like.

As regards the compounds of general formula (V), the polyamines used for the synthesis of these products are the same as those described above for the synthesis of polyaldimines.

Mention may be made, as example of ketones of use in the synthesis of polyketimines for an embodiment of the invention, of pentan-3-one, 2,2,6,6-tetramethylcyclohexanone, 2,2,4,4-tetramethyl-3-pentanone, 4-methylpentan-2-one, 2,4-dimethylpentan-3-one, 2,6-dimethylheptan-4-one, cyclohexanone, acetone, 2,6-dimethylcyclohexanone, 2,2,4,4-tetramethylpentan-3-one, (1,1':3',1")ter(cyclohexan)-2'-one, dicyclohexylmethanone, dicyclopentylmethanone, cyclopentanone, bicyclo[3.3.1]nonan-9-one, dicyclopropylmethanone, 2,6-di(tert-butyl)cyclohexanone, 2,6-dimethylcyclohexanone or 2,4-dimethyl-3-pentanone and preferably 4-methylpentan-2-one, 2,4-dimethylpentan-3-one, 2,6-dimethylheptan-4-one, cyclohexanone or cyclopentanone.

II.5. Crosslinking System

The crosslinking system can be a vulcanization system; it is preferably based on sulphur or sulphur donors and on primary vulcanization accelerator (preferably 0.5 to 10.0 phr of primary accelerator). Additional to this vulcanization system are optionally various known secondary vulcanization accelerators or vulcanization activators, such as zinc oxide (preferably for 0.5 to 10.0 phr), stearic acid, guanidine derivatives (in particular diphenylguanidine) or others (preferably for 0.5 to 5.0 phr each). The sulphur is used at a preferred content of between 0.5 and 10 phr, more preferably of between 0.5 and 5.0 phr, for example between 0.5 and 3.0 phr when the invention is applied to a tire tread.

Use may be made, as (primary or secondary) accelerator, of any compound capable of acting as accelerator of the vulcanization of diene elastomers in the presence of sulphur, in particular accelerators of the thiazole type and their derivatives and accelerators of the thiuram and zinc dithiocarbamate types. These accelerators are more preferably selected from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI"), zinc dibenzyldithiocarbamate (abbreviated to "ZBEC") and the mixtures of these compounds. Preferably, use is made of a primary accelerator of the sulphenamide type.

According to a specific embodiment of the invention, the composition of the invention is devoid of guanidine derivative or comprises less than 0.5 phr thereof. Preferably, the composition is either completely devoid of such compounds or it comprises less than 0.45 phr, preferably less than 0.4 phr, more preferably less than 0.3 phr, preferably less than 0.2 phr and very preferably less than 0.1 phr thereof. The term "guanidine derivative" is understood to mean the organic compounds bearing a guanidine functional group as main functional group, such as those known in tire compositions, in particular as vulcanization accelerators, for example diphenylguanidine (DPG) or di(ortho-tolyl)guanidine (DOTG).

According to another specific embodiment of the invention, in the tire according to the invention, the composition comprising the epoxy resin necessary for the requirements of the invention is also devoid of zinc or comprises less than 0.5 phr, preferably less than 0.3 phr, more preferably less than 0.2 phr and very preferably less than 0.1 phr thereof.

II.6. Various Additives

The rubber compositions of the treads in accordance with the invention also comprise all or a portion of the usual additives generally used in elastomer compositions intended for the manufacture of treads, such as, for example, pigments, protection agents, such as antiozone waxes, chemical antiozonants or antioxidants, antifatigue agents, reinforcing resins other than those mentioned above or plasticizing agents. Preferably, this plasticizing agent is a solid hydrocarbon resin (or plasticizing resin), an extending oil (or plasticizing oil) or a mixture of the two.

These compositions can also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

II.7. Preparation of the Rubber Compositions

The compositions used in the treads of embodiments of the invention can be manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following stages:

incorporating, in a diene elastomer, during a first stage ("non-productive" stage), a reinforcing filler, everything being kneaded thermomechanically (for example, in one or more goes) until a maximum temperature of between 110° C. and 190° C. is reached;

cooling the combined mixture to a temperature of less than 100° C.;

subsequently incorporating, during a second stage ("productive" stage), a crosslinking system;

kneading everything up to a maximum temperature of less than 110° C.

The epoxy resin and the hardener can be incorporated either during the non-productive phase or during the productive phase. Preferably, the epoxy resin is incorporated during the non-productive phase and the hardener during the productive phase.

By way of example, the non-productive phase is carried out in a single thermomechanical stage during which, in a first step, all the necessary base constituents (a diene elastomer, reinforcing filler and others) are introduced into an appropriate mixer, such as a standard internal mixer, followed, in a second step, for example after kneading for one to two minutes, by the other additives, optional additional agents for covering the filler or optional additional processing aids, with the exception of the crosslinking system. The total duration of the kneading in this non-productive phase is preferably between 1 and 15 min. During this phase, the epoxy resin and the hardener, or only the epoxy resin, can optionally be added. If the epoxy resin and the hardener are not added during this phase, they will have to be added during the following phase below, in order for the epoxy resin and the hardener necessary for the requirements of the embodiments of the invention to be present in the completed composition.

After cooling the mixture thus obtained, the crosslinking system is then incorporated in an external mixer, such as an open mill, maintained at a low temperature (for example between 40° C. and 100° C.). The combined product is then mixed (productive phase) for a few minutes, for example between 2 and 15 min. During this phase, the epoxy resin and the hardener can optionally be added, or only the hardener if the epoxy resin was added during the non-productive phase.

The final composition thus obtained can subsequently be calendered, for example in the form of a sheet or of a plaque, in particular for laboratory characterization, or also extruded, for example in order to form a rubber profiled element used in the manufacture of a tire.

The invention relates to the tires and the semi-finished products for tires described above, rubber articles, both in the raw state (that is to say, before curing) and in the cured state (that is to say, after crosslinking or vulcanization).

II.8. Tire of the Invention

The rubber composition according to an embodiment of the invention can be used in different parts of the tire, in particular in the crown, the area of the bead, the area of the sidewall and the tread (in particular in the underlayer of the tread).

According to a preferred embodiment of the invention, the rubber composition described above can be used in the tire as a rigid elastomer layer in at least one part of the tire.

Elastomer "layer" is understood to mean any three-dimensional component, made of rubber (or "elastomer", the two being regarded as synonyms) composition, having any shape and thickness, in particular sheet, strip or other component having any cross-section, for example rectangular or triangular.

First of all, the elastomer layer can be used as tread underlayer positioned in the crown of the tire between, on the one hand, the tread, i.e. the portion intended to come into contact with the road during running, and, on the other hand, the belt reinforcing the said crown. The thickness of this elastomer layer is preferably within a range extending from 0.5 to 10 mm, in particular within a range from 1 to 5 mm.

According to another preferred embodiment of the invention, the rubber composition according to an embodiment of the invention can be used to form an elastomer layer positioned in the region of the area of the bead of the tire, radially between the carcass ply, the bead wire and the turn-up of the carcass ply.

Equally, the composition according to an embodiment of the invention can be used in the plies of the crown (tire belt) or in the area between the ends of the plies of the crown and the carcass ply.

Another preferred embodiment of the invention can be the use of the composition according to an embodiment of the invention to form an elastomer layer positioned in the area of the sidewall of the tire.

Alternatively, the composition of an embodiment of the invention can advantageously be used in the tread of the tire.

III. Examples of the Implementation of the Invention

III.1. Preparation of the Compositions

The following tests are carried out in the following way: the diene elastomer, the reinforcing filler and the epoxy resin, and also the various other ingredients, with the exception of the vulcanization system and the hardener, are successively introduced into an internal mixer (final degree of filling: approximately 70% by volume), the initial vessel temperature of which is approximately 60° C. Thermomechanical working (non-productive phase) is then carried out in one stage, which lasts in total approximately from 3 to 4 min, until a maximum "dropping" temperature of 180° C. is reached.

The mixture thus obtained is recovered and cooled and then sulphur, an accelerator of sulphenamide type and the hardener are incorporated on a mixer (homofinisher) at 30° C., everything being mixed (productive phase) for an appropriate time (for example between 5 and 12 min).

The compositions thus obtained are subsequently calendered, either in the form of plaques (thickness from 2 to 3 mm) or of thin sheets of rubber, for the measurement of their physical or mechanical properties, or extruded in the form of a profiled element.

III.2. Tests on Rubber Compositions

This test illustrates rubber compositions which can be used in particular in an underlayer or in a bottom area of a tire, which areas require a high low-strain stiffness. These compositions exhibit a greater stiffness than a conventional rubber composition (comprising a phenolic resin and HMT as methylene donor), while retaining a similar and acceptable level of hysteresis; furthermore, the processability and the scorch safety of the compositions of embodiments of the invention are markedly improved, with respect to the compositions comprising an epoxy resin and a polyamine hardener.

For this, rubber compositions were prepared as indicated above, some of which in accordance with the invention (C3, C5, C6 and C10) and some of which not in accordance (controls C1, C2, C4, C7, C8 and C9) (see Table 1).

The compositions C1 to C6 are compositions having a low content of reinforcing resin, whereas the compositions C7 to C10 are compositions having a high content of reinforcing resin.

The compositions C1 to C6, represented here in phr, comprise the same molar amount of hardener (14 mmol). The variations in the contents in phr shown in Table 1 are due to the differences in molar mass between the various hardeners.

The compositions C7 to C10 are also represented in phr. C7 and C8 exhibit the same amount in weight of reinforcing resin, showing the effect of the replacement by weight, this weight being reduced in the composition C9. The composition C10 according to the invention comprises the same molar amounts of resin and of hardener as the composition C9.

The properties of the compositions C1 to C10 were measured as indicated above and the results are shown in Table 2.

TABLE 1

|  | C1 | C2 | C3 | C4 | C5 | C6 | C7 | C8 | C9 | C10 |
|---|---|---|---|---|---|---|---|---|---|---|
| NR (1) | 100 | 100 | 100 | 100 | 100 | 100 | 100 | 100 | 100 | 100 |
| Carbon black (2) | 70 | 70 | 70 | 70 | 70 | 70 | 70 | 70 | 70 | 70 |
| ZnO (3) | 7 | 7 | 7 | 7 | 7 | 7 | 3 | 3 | 3 | 3 |
| Stearic acid (4) | 0.6 | 0.6 | 0.6 | 0.6 | 0.6 | 0.6 | 2 | 2 | 2 | 2 |
| 6PPD (5) | 1.4 | 1.4 | 1.4 | 1.4 | 1.4 | 1.4 | 2.5 | 2.5 | 2.5 | 2.5 |
| Sulphur (6) | 6 | 6 | 6 | 6 | 6 | 6 | 3 | 3 | 3 | 3 |
| Accelerator (7) | 0.8 | 0.8 | 0.8 | 0.8 | 0.8 | 0.8 | 2 | 2 | 2 | 2 |
| Resin 1 (8) | 6 |  |  |  |  |  | 12 |  |  |  |
| Resin 2 (9) |  | 6 | 6 | 6 | 6 | 6 |  | 12 | 12 | 12 |
| Hardener 1 (10) | 1.4 |  |  |  |  |  |  | 4 |  |  |
| Hardener 2 (11) |  | 2 |  |  |  |  |  |  | 4 | 3.1 |
| Hardener 3 (12) |  |  | 4.6 |  |  |  |  |  |  |  |
| Hardener 4 (13) |  |  |  | 2 |  |  |  |  |  |  |
| Hardener 5 (14) |  |  |  |  | 4.6 |  |  |  |  |  |
| Hardener 6 (15) |  |  |  |  |  | 3.5 |  |  |  | 5.4 |

(1) Natural rubber;
(2) Carbon black N326 (name according to Standard ASTM D-1765);
(3) Zinc oxide (industrial grade, Umicore);
(4) Stearin (Pristerene 4931 from Uniqema);
(5) N-(1,3-Dimethylbutyl)-N-phenyl-para-phenylenediamine (Santoflex 6-PPD from Flexsys);
(6) 80% Insoluble sulphur;
(7) Acc: N-cyclohexyl-2-benzothiazolesulphenamide (Santocure CBS from Flexsys) or N-(tert-butyl)-2-benzothiazolesulphenamide (TBBS).
(8) Resin 1: phenol/formaldehyde novolac resin (Peracit 4536K from Perstorp);
(9) Resin 2: epoxy resin (DEN 439 from Dow Chemical Co.);
(10) Hardener 1: hexamethylenetetramine (from Degussa);
(11) Hardener 2: p-xylylenediamine (Sigma-Aldrich), MW = 136.2;
(12) Hardener 3: N,N'-bis(phenylmethylene)-1,4-benzenedimethanamine (CAS 52384-47-1), MW = 312.4;
(13) Hardener 4: 1,8-diaminooctane (Sigma-Aldrich), MW = 144.3;
(14) Hardener 5: N,N'-bis(phenylmethylene)octane-1,8-diamine (CAS 75190-05-5), MW = 320.5;
(15) Hardener 6: N,N'-dibenzylideneethylenediamine (Sigma-Aldrich), MW = 236.3.

TABLE 2

|  | C1 | C2 | C3 | C4 | C5 | C6 | C7 | C8 | C9 | C10 |
|---|---|---|---|---|---|---|---|---|---|---|
| Fixing 115° C. (min) | >30 |  | >30 | 6.5 | >30 | 30 | 26 | 0 |  | 15 |
| Mooney | 60 | 79 | 54 | >100 | 52 | 53 | 45 | >100 | 65 | 34 |
| G* 10% 40° C. | 9.8 | 7.1 | 9.9 | 8.4 | 9.9 | 11.2 | 6.4 | 8.2 | 7.3 | 7.7 |
| Tan(δ)max 40° C. | 0.31 | 0.31 | 0.38 | 0.28 | 0.36 | 0.37 | 0.23 | 0.28 | 0.26 | 0.32 |

It is noted that the replacement of the phenol/formaldehyde resin/HMT hardener(s) pair by an epoxy resin and a polyimine hardener in the compositions of the invention C3, C5, C6 and C10 makes it possible to obtain a complex dynamic shear modulus G* (10%) at 40° C. which is greater than that of their respective control compositions, representative of an increase in the low-strain stiffness of the compositions according to the invention, while limiting the increase in the loss factor at 40° C. (denoted tan(δ)max), that is to say a hysteresis which remains acceptable, in particular in certain areas of the tire. Furthermore, in the compositions of the invention, a marked improvement is noted in the processability of the compositions, represented by lowered Mooney values and/or increased fixing times.

To sum up, the results of these tests demonstrate that the use of an epoxy resin and of a polyimine hardener in the compositions of the invention makes it possible to obtain rubber compositions with a superior low-strain stiffness to that of a conventional composition (in this instance, control composition), synonymous with an improvement in the road behaviour, while retaining an acceptable hysteresis, in particular in certain areas of the tire, especially in the bottom area and in the underlayer. These compositions have a very good processability, at least as good as the control compositions.

The invention claimed is:

1. A rubber composition based on at least one diene elastomer, a reinforcing filler, a crosslinking system, an epoxy resin at a content within a range extending from 1 to 20 phr, and a polyimine hardener at a content within a range extending from 0.2 to 15 phr, wherein the polyimine hardener is a polyimine of formula:

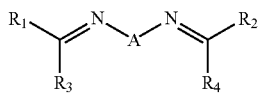

(I)

wherein:
$R_1$ and $R_2$ independently represent identical or different groups selected from the group consisting of alkyl groups having from 1 to 20 carbon atoms, cycloalkyl groups having from 5 to 24 carbon atoms, aryl groups having from 6 to 30 carbon atoms, and aralkyl groups having from 7 to 25 carbon atoms, which groups can optionally be interrupted by heteroatoms, $R_3$ and $R_4$ independently represent identical or different groups selected from the group consisting of hydrogen, alkyl groups having from 1 to 20 carbon atoms, cycloalkyl groups having from 5 to 24 carbon atoms, aryl groups having from 6 to 30 carbon atoms, and aralkyl groups having from 7 to 25 carbon atoms, which groups can optionally be interrupted by heteroatoms, A represents a hydrocarbon group comprising at least 2 carbon atoms, optionally interrupted by heteroatoms, and the $R_1$, $R_2$, $R_3$, $R_4$, and A groups are not substituted.

2. The rubber composition according to claim 1, wherein the at least one diene elastomer is selected from the group consisting of natural rubber, synthetic polyisoprenes, polybutadienes, butadiene copolymers, isoprene copolymers, and the mixtures of these elastomers.

3. The rubber composition according to claim 1, wherein the content of epoxy resin is within a range extending from 3 to 20 phr.

4. The rubber composition according to claim 3, wherein the content of epoxy resin is within a range extending from 5 to 18 phr.

5. The rubber composition according to claim 1, wherein $R_1$ and $R_2$ independently represent identical or different groups selected from the group consisting of alkyl groups having from 1 to 12 carbon atoms, cycloalkyl groups having from 5 to 8 carbon atoms, aryl groups having from 6 to 24 carbon atoms, and aralkyl groups having from 7 to 13 carbon atoms.

6. The rubber composition according to claim 5, wherein $R_1$ and $R_2$ each represent an aryl radical having from 6 to 24 carbon atoms.

7. The rubber composition according to claim 1, wherein $R_3$ and $R_4$ independently represent identical or different groups selected from the consisting of hydrogen, alkyl groups having from 1 to 12 carbon atoms, cycloalkyl groups having from 5 to 8 carbon atoms, aryl groups having from 6 to 24 carbon atoms, and aralkyl groups having from 7 to 13 carbon atoms.

8. The rubber composition according to claim 7, wherein $R_3$ and $R_4$ independently represent a hydrogen atom or an aryl radical having from 6 to 24 carbon atoms.

9. The rubber composition according to claim 8, wherein $R_3$ and $R_4$ independently represent a hydrogen or a phenyl radical.

10. The rubber composition according to claim 1, wherein A represents a hydrocarbon group comprising from 2 to 18 carbon atoms, optionally interrupted by heteroatoms.

11. The rubber composition according to claim 10, wherein A represents an alkylene or cycloalkylene group comprising from 2 to 18 carbon atoms, optionally interrupted by heteroatoms, or an aralkylene group comprising from 8 to 18 carbon atoms, optionally interrupted by heteroatoms, wherein, in the alkylene or aralkylene carbon chains optionally interrupted by heteroatoms, there may be double or triple bonds between the carbon atoms.

12. The rubber composition according to claim 11, wherein A represents an alkylene group comprising from 2 to 12 carbon atoms.

13. The rubber composition according to claim 1, wherein the polyimine hardener is a polyaldimine.

14. The rubber composition according to claim 1, wherein the polyimine hardener is a polyketimine.

15. The rubber composition according to claim 1, wherein the content of polyimine hardener is within a range extending from 0.5 to 12 phr.

16. The rubber composition according to claim 15, wherein the content of polyimine hardener is within a range extending from 2 to 10 phr.

17. The rubber composition according to claim 1, wherein the reinforcing filler comprises carbon black, silica or a mixture of carbon black and silica.

18. The rubber composition according to claim 1, wherein the amount of reinforcing filler is between 20 and 200 phr.

19. A tire comprising a rubber composition according to claim 1.

20. A finished or semi-finished rubber article comprising a rubber composition according to claim 1.

21. A process for preparing a rubber composition according to claim 1, comprising: incorporating, in the at least one diene elastomer, during a first stage ("non-productive" stage), the reinforcing filler, between 1 and 20 phr of the epoxy resin and between 0.2 and 15 phr of the polyimine hardener, comprising kneading everything thermomechanically until a maximum temperature of between 110° C. and 190° C. is reached; cooling the combined mixture to a temperature of less than 100° C.; subsequently incorporating, during a second stage ("productive" stage), the crosslinking system; kneading everything up to a maximum temperature of less than 110° C.

22. A process for preparing a rubber composition according to claim 1, comprising: incorporating, in the at least one diene elastomer, during a first stage ("non-productive" stage), the reinforcing filler, comprising kneading everything thermomechanically until a maximum temperature of between 110° C. and 190° C. is reached; cooling the combined mixture to a temperature of less than 100° C.; subsequently incorporating, during a second stage ("productive" stage), the crosslinking system, between 1 and 20 phr of the epoxy resin and between 0.2 and 15 phr of the polyimine hardener; kneading everything up to a maximum temperature of less than 110° C.

23. A process for preparing a rubber composition according to claim 1, comprising: incorporating, in the at least one diene elastomer, during a first stage ("non-productive" stage), the reinforcing filler and between 1 and 20 phr of the epoxy resin, comprising kneading everything thermomechanically until a maximum temperature of between 110° C. and 190° C. is reached; cooling the combined mixture to a temperature of less than 100° C.; subsequently incorporating, during a second stage ("productive" stage), the crosslinking system and between 0.2 and 15 phr of the polyimine hardener; kneading everything up to a maximum temperature of less than 110° C.

24. A process for preparing a rubber composition according to claim 1, comprising: incorporating, in the at least one diene elastomer, during a first stage ("non-productive" stage), the reinforcing filler and between 0.2 and 15 phr of the polyimine hardener, comprising kneading everything thermomechanically until a maximum temperature of between 110° C. and 190° C. is reached; cooling the combined mixture to a temperature of less than 100° C.; subsequently incorporating, during a second stage ("productive" stage), the crosslinking system and between 1 and 20 phr of the epoxy resin; kneading everything up to a maximum temperature of less than 110° C.

* * * * *